(12) United States Patent
Seiffert (10) Patent No.: US 8,578,353 B2
(45) Date of Patent: Nov. 5, 2013

(54) TOOL FOR ANALYZING SIEBEL ESCRIPTS

(75) Inventor: Oliver Derek Alexander Seiffert, Berlin (DE)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/489,482

(22) Filed: Jun. 6, 2012

(65) Prior Publication Data

US 2012/0266025 A1 Oct. 18, 2012

Related U.S. Application Data

(63) Continuation of application No. 12/266,289, filed on Nov. 6, 2008, now Pat. No. 8,225,298.

(51) Int. Cl.
*G06F 9/45* (2006.01)
(52) U.S. Cl.
USPC .......................................................... 717/143
(58) Field of Classification Search
USPC .......................................................... 717/143
See application file for complete search history.

(56) References Cited

U.S. PATENT DOCUMENTS

| | | | | |
|---|---|---|---|---|
| 6,658,646 | B1* | 12/2003 | Hernandez, III | 717/115 |
| 7,003,765 | B1* | 2/2006 | Venkatasubramanian et al. | 717/143 |
| 7,051,322 | B2* | 5/2006 | Rioux | 717/143 |

* cited by examiner

*Primary Examiner* — Philip Wang
(74) *Attorney, Agent, or Firm* — Yudell Isidore Ng Russell PLLC (57) ABSTRACT

A method, system and computer program product for enabling automated analysis of an extracted eScript to identify one or more problems within a configuration and script. The eScript is extracted from a Siebel repository and received in a DAVID (Development Application Verification Information on Demand for Siebel application where the VB.NET application, called SiebelParser, is utilized to conduct the analysis of the eScript. Occurrences of issues within an eScript are detected by SiebelParser. Issues within the eScript may include one or more of: empty event handlers, explicit object release, setting field values utilizing hard coded values, unnecessarily activated fields, call to next record after a call to delete record, and functions containing unnecessary code. Results from the analysis are reported to one log file document. The results of SiebelParser's log file are later incorporated to a spreadsheet by DAVID, to provide a more readable output format.

18 Claims, 8 Drawing Sheets

TOOL FOR ANALYZING SIEBEL ESCRIPTS

PRIORITY CLAIM

The present application is a continuation of and claims priority from U.S. patent application Ser. No. 12/266,289, filed on Nov. 6, 2008, titled "Tool for Analyzing Siebel Escripts," which is incorporated by reference herein in its entirety and for all purposes.

BACKGROUND

1. Technical Field

The present invention generally relates to computer systems and in particular to applications in computer memory systems.

2. Description of the Related Art

Oracle's Siebel Customer Relationship Management (CRM) Software utilizes eScript as a scripting language. The scripting language of eScript is based on JavaScript. Siebel allows manual analysis eScripts to provide quality assurance. During manual quality assurance, eScripts are selected and checked for non-functional scripting issues, for example like missing explicit object releases for instantiated objects. When the selected eScript contains any scripting issue, the information is noted. Multiple problems exist with the current method of quality assurance of eScripts. Manual analysis is prone to multiple errors. The examination of each eScript is a time intensive analysis wherein an individual may be distracted or become exhausted; thereby the individual is incapable of performing an equal and high-quality analysis of each eScript.

Manual quality assurance of an eScript requires numerous analysis steps throughout the lifecycle of the eScript. Senior developers often manually verify the eScript analysis of junior developers. In addition to the multitier system of analysis, Oracle Siebel provides a service called "Siebel Configuration and Scripting Review". Siebel Configuration and Scripting Review is a costly and time intensive system, and the system is not complete in terms of identifying scripting issues during eScript analysis.

SUMMARY OF ILLUSTRATIVE EMBODIMENTS

Disclosed are a method, system and computer program product for enabling automated analysis of an extracted eScript to identify one or more problems within a configuration and script. The eScript is extracted from a Siebel repository and received in a DAVID (Development Application Verification Information on Demand for Siebel application where the VB.NET application, called SiebelParser, is utilized to conduct the analysis of the eScript. Occurrences of issues within an eScript are detected by SiebelParser. Issues within the eScript may include one or more of: empty event handlers, explicit object release, setting field values utilizing hard coded values, unnecessarily activated fields, call to next record after a call to delete record, and functions containing unnecessary code. Results from the analysis are reported to one log file document. The results of SiebelParser's log file are later incorporated to a spreadsheet by DAVID, to provide a more readable output format.

The above as well as additional features of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION

The illustrative embodiments provide a method, system and computer program product for enabling automated analysis of an extracted eScript to identify one or more problems within a configuration and script. The eScript is extracted from a Siebel repository and received in a DAVID (Development Application Verification Information on Demand for Siebel application where the VB.NET application, called SiebelParser, is utilized to conduct the analysis of the eScript. Occurrences of issues within an eScript are detected by SiebelParser. Issues within the eScript may include one or more of: empty event handlers, explicit object release, setting field values utilizing hard coded values, unnecessarily activated fields, call to next record after a call to delete record, and functions containing unnecessary code. Results from the analysis are reported to one log file document. The results of SiebelParser's log file are later incorporated to a spreadsheet by DAVID, to provide a more readable output format. In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, the specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

Figure 1:
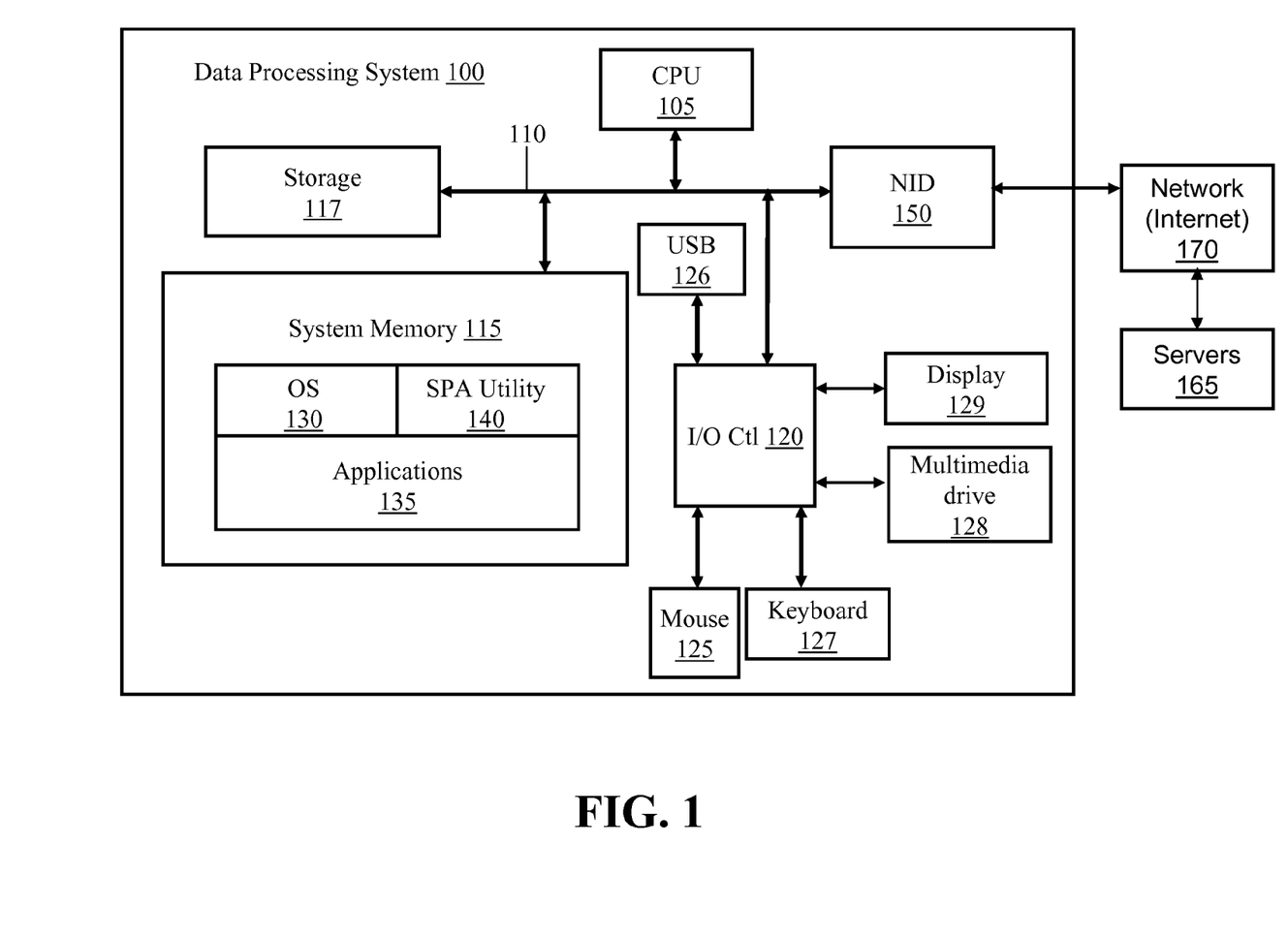
FIG. 1 is a block diagram of a data processing system, within which various features of the invention may advantageously be implemented according to one embodiment of the invention.

With reference now to the figures, FIG. 1 depicts a block diagram representation of a data processing system (and connected network). Data processing system (DPS) 100 comprises at least one processor or central processing unit (CPU) 105 connected to system memory 115 via system interconnect/bus 110. Also connected to system bus 110 is I/O controller 120, which provides connectivity and control for input devices, of which pointing device (or mouse) 125 and keyboard 127 are illustrated, and output devices, of which display 129 is illustrated. Additionally, a multimedia drive 128 (e.g., CDRW or DVD drive) and USB (universal serial bus) port 126 are illustrated, coupled to I/O controller 120. Multimedia drive 128 and USB port 126 may operate as both input and output (storage) mechanisms. DPS 100 also comprises storage 117, within which data/instructions/code may be stored.

DPS 100 is also illustrated with a network interface device (NID) 150, with which DPS 100 connects to one or more servers 165 via an access network, such as the Internet 170. In the described embodiments, Internet 170 is a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), a virtual private network (VPN), or other wide area network (WAN) other than the Internet, for example.

Notably, in addition to the above described hardware components of DPS 100, various features of the invention are completed via software (or firmware) code or logic stored within memory 115 or other storage (e.g., storage 117) and executed by CPU 105. Thus, illustrated within system memory 115 are a number of software/firmware components, including operating system (OS) 130 (e.g., Microsoft Windows®, a trademark of Microsoft Corp, GNU®/Linux®, registered trademarks of the Free Software Foundation and Linus Torvalds, or AIX®, a registered trademark of IBM), applications 135, which may include Oracle's Siebel Customer Relationship Management (CRM) software, and SiebelParser Application (SPA) utility 140. In actual implementation, applications 135 and SPA utility 140 may be combined as a single application collectively providing the various functions of each individual software component when the corresponding code is executed by the CPU 105. For simplicity, SPA utility 140 is illustrated and described as a stand alone or separate software/firmware component, which provides specific functions, as described below.

CPU 105 executes SPA utility 140 as well as OS 130, which supports the user interface features of SPA utility 140. Among the software code/instructions provided by SPA utility 140, and which are specific to the invention, are: (a) code for enabling automated analysis of an extracted eScript to identify one or more problems within a configuration and script; (b) code for detecting the occurrences of issues within an eScript; and (c) code for outputting results from the automated eScript analysis to a log file. For simplicity of the description, the collective body of code that enables these various features is referred to herein as SPA utility 140. According to the illustrative embodiment, when CPU 105 executes SPA utility 140, DPS 100 initiates a series of functional processes that enable the above functional features as well as additional features/functionality, which are described below within the description of FIGS. 2-8.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
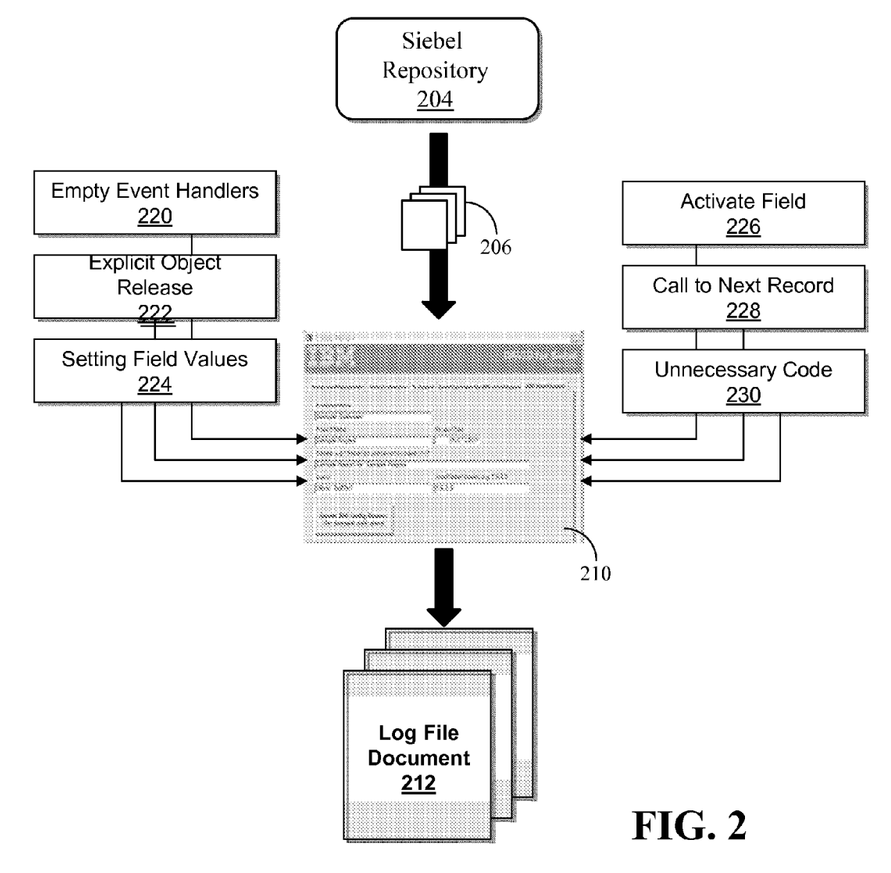
FIG. 2 is a diagram illustrating functions of an automatic eScript analysis system in accordance with one embodiment of the invention.

With reference now to FIG. 2, which illustrates functions of an automatic eScript analysis system. SiebelParser application 210 (utilized by DAVID for Siebel) receives eScripts 206 from Siebel repository 204. SiebelParser application 210 detects occurrences of issues within the eScript, when the issues include one or more of: empty event handlers, explicit object release, setting field values utilizing hard coded values, unnecessarily activating fields, call to next record after a call to delete record, and functions containing unnecessary code. The issues are detected utilizing empty event handlers 220, explicit object release 222, setting field values 224, activate field 226, call to next record 228, and unnecessary code 230. The results of the analysis are output to log file document 212.

In one embodiment, DAVID for Siebel automatically initiates SiebelParser application 210 when eScript 206 is extracted from Siebel repository 204. eScript 206 is analyzed by SiebelParser application 210 utilizing an automated configuration that include or more of: empty event handlers 220, explicit object release 222, setting field values 224, activate field 226, call to next record 228, and unnecessary code 230. The results from the analysis are output to one or more of log file document 212.

In one embodiment, eScript 206 is extracted from Siebel repository 204. eScript 206 contains an empty event handler, thereby eScript 206 should contain three line feeds or less. SiebelParser application 210 checks whether eScript 206 is empty (no text included) or contains the required three lines or less. The results are written to log file document 212.

In one embodiment, explicit object release 222 of SiebelParser application 210 utilizes a VB.NET collection object to store all references for instantiated business objects, business components, business services, property sets, dates and arrays found in eScript 206. In eScript 206 developers may utilize strong typing to explicitly define a variable type, for example "BusObject", for a Business Object. Special eScript functions may also be applied to instantiate a declared object, for example "TheApplication.GetBusObject("Account");" for the Business Object "Account". Both strong typing and special eScript functions may be detected by explicit object release 222 of SiebelParser application 210. In parallel, explicit object release 222 checks for statements such as "loBusObject=null;", and utilizes the found variable name on the left side of the equal sign to delete an item of the VB.Net collection object. After each line of extracted eScript 206 is analyzed, if the remaining number of items in the VB.Net collection is greater than zero, an object has not been released correctly; therefore, the result is written to log file document 212.

In one embodiment, setting field values 224 of SiebelParser application 210 searches eScript 206 line by line to insure eScript 206 does not contain hard-coded values. Statements such as "SetFieldValue" indicate an item is written to a business component. The item written to the business component should be written without hard-coded values such as loBN.SetFieldValue("Some Field Name","This is the value");". Setting field values 224 searches for lines within eScript 206 that contain "SetFieldValue" command, and checks the last three characters of the line for the occurrence of ");". When the "SetFieldValue" command and the occurrence of ");" are detected by Setting field values 224, results affirming hard-coded values were found, are written to log file document 212.

In one embodiment, activate field 226 of SiebelParser application 210 utilizes VB.NET collection object to store each found reference for the activated fields of eScript 206. Activate field 226 utilizes the field name as the key to the collection and the line of code as the value. Activate field 226 of SiebelParser application 210 searches for "SetFieldValue" or "GetFieldValue" statements, which contain fields of business components. The field name is extracted from the line of code, and an attempt is made to delete the collection item with the field name (or key). If the count of items of the collection object is greater than zero, eScript 206 may contain unnecessarily activated fields. The results are written to log file document 212.

In one embodiment, call to next record 228 of SiebelParser application 210 identifies a pattern in eScript 206. Typically in eScript 206, a call to "NextRecord" occurs within three lines following a call to "DeleteRecord". When analyzing eScript 206, call to next record 228 verifies call to "NextRecord" has occurred within three lines following "DeleteRecord." When the pattern is found the results are written to log file document 212.

In one embodiment, unnecessary code within eScript 206 may be identified by unnecessary code 230 of SiebelParser application 210. Unnecessary code 230 searches eScript 206 for a pattern that includes execution of "WriteRecord" and within the next two lines of code, a "NextRecord" is called. The call for "NextRecord" within the next two lines of an execution, of "WriteRecord", is unnecessary. Therefore, the results are written to log file document 212.

FIGS. 3-8 are flow charts illustrating various methods by which the above processes of the illustrative embodiments are completed. Although the methods illustrated in FIGS. 3-8 may be described with reference to components shown in FIGS. 1-2, it should be understood that this is merely for convenience and alternative components and/or configurations thereof can be employed when implementing the various methods. Key portions of the methods may be completed by SPA utility 140 executing within DPS 100 (FIG. 1) and controlling specific operations on DPS 100, and the methods are thus described from the perspective of both SPA utility 140 and DPS 100.

Figure 3:
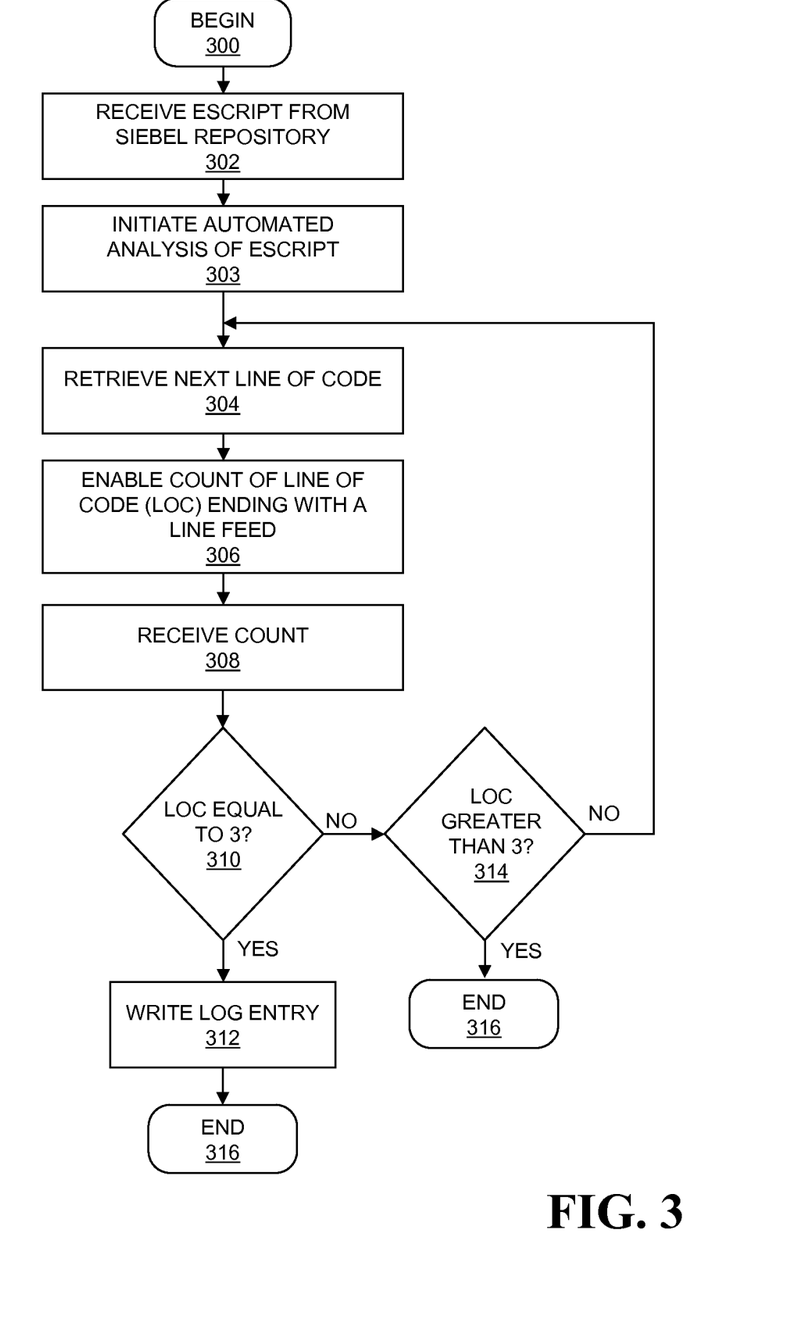
FIG. 3 is a logic flow chart describing analysis of eScripts containing empty event handlers according to one embodiment of the invention.

FIG. 3 describes the method for analyzing eScripts containing empty event handlers. The process of FIG. 3 begins at initiator block 300 and proceeds to block 302, at which an eScript is received from the Siebel repository. At block 303, automated analysis of the eScript is initiated. The next line of code, within the eScript, is retrieved at block 304. A count is enabled, at block 306, to track the line of codes ending with a line feed. The count is received by SPA utility 140 at block 308. A decision is made at block 310, whether the count of the lines of code (ending with a line feed), within the eScript, equal to three. If the count of the lines of code equals three, a log entry is written at block 312. The process ends at block 316. If the count of the lines of code is greater than three, the process continues to block 314. At block 314 a decision is made whether the count of the lines of code is greater than three. If the count of the lines of code is not greater than three, the process retrieves the next line of code within the eScript. If the count of the lines of code is greater than three, the process ends. Therefore, the results are written to the log file document.

Figure 4:
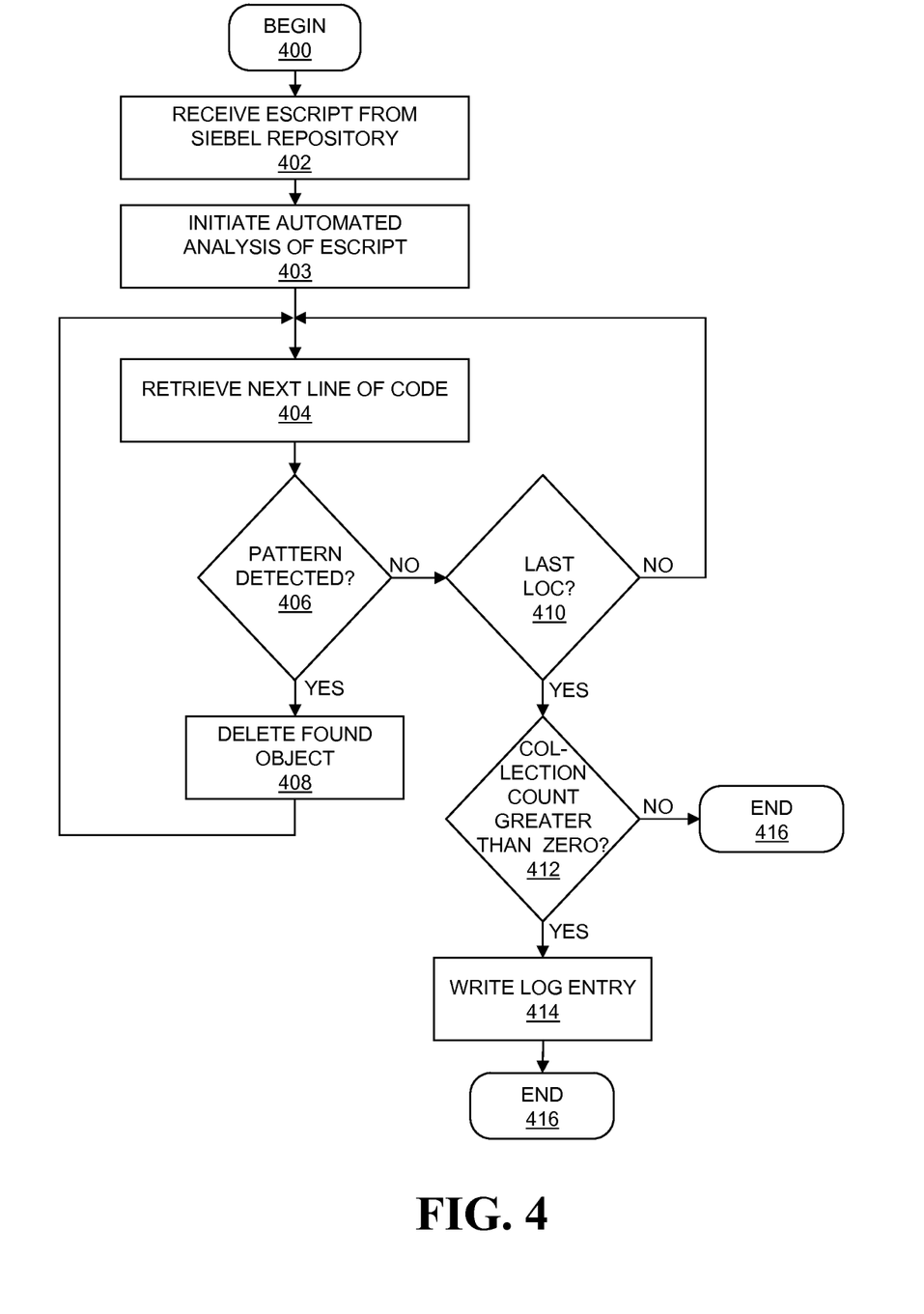
FIG. 4 is a logic flow chart describing analysis of eScripts containing explicit objects to be released in accordance with one embodiment of the invention.

The method for analysis of eScripts containing explicit objects to be released is described in FIG. 4. The process of FIG. 4 begins at initiator block 400 and proceeds to block 402, at which an eScript is received from the Siebel repository. At block 403, automated analysis of the eScript is initiated. The next line of code, within the eScript, is retrieved at block 404. A decision is made at block 406 whether a pattern is detected. If a pattern is detected at block 406, the process continues to block 408. Detecting the pattern identifies the object to be deleted. The object is deleted at block 408; the process continues to retrieve the next line of code. If a pattern is not detected at block 406, the process continues to block 410. At block 410, a decision is made whether the line of code, being analyzed, is the last line of code. If the line of code is not the last line of code, the process returns to retrieve the next line of code. If the line of code is the last line of code, the process continues to block 412. A decision is made, at block 412, whether the collection count is greater than zero. If the collection count is not greater than zero, the process ends at block 416. If the collection count is greater than zero, the process continues to block 414. At block 414 a log entry is written. The process ends at block 416.

Figure 5:
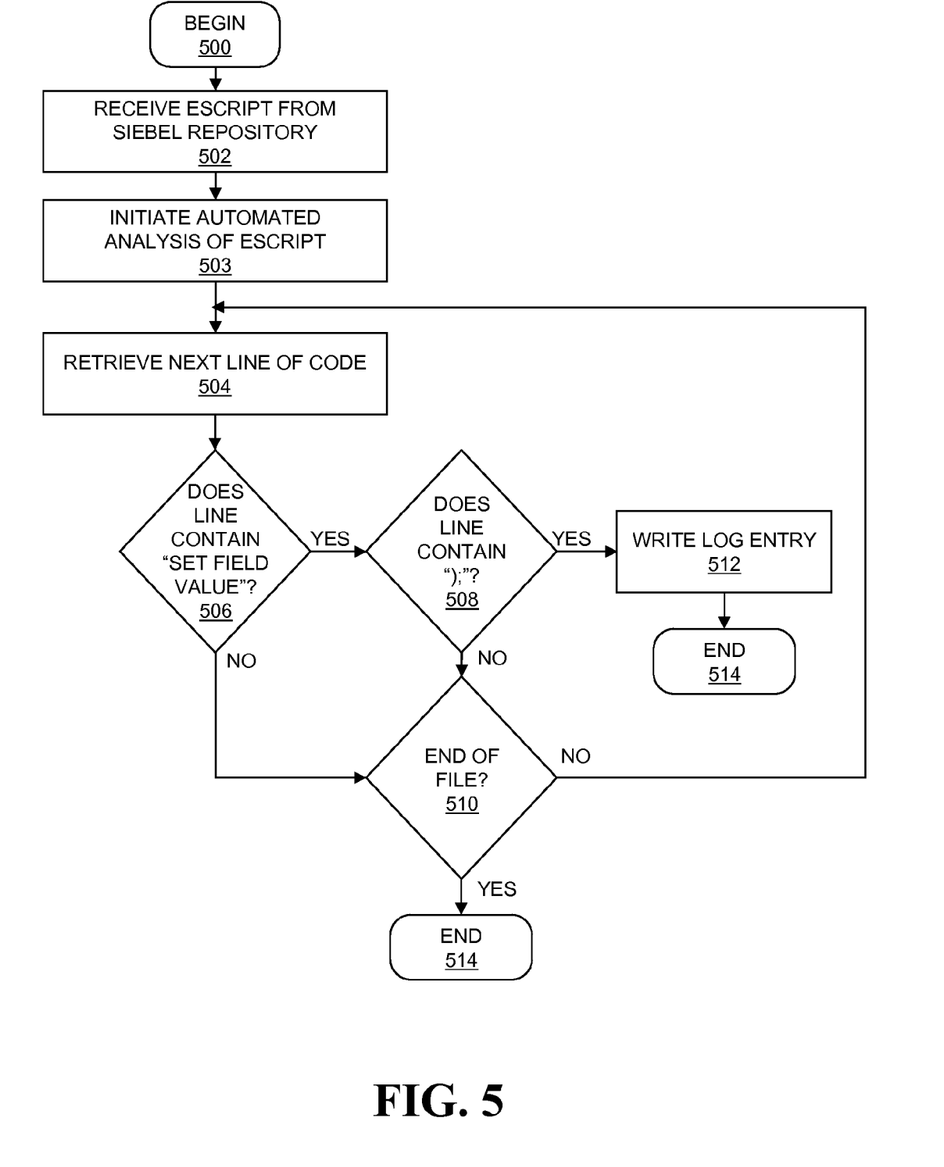
FIG. 5 is a logic flow chart which describes searching an eScript for hard-coded values according to one embodiment of the invention.

FIG. 5 describes the method of searching an eScript for hard-coded values. The process of FIG. 5 begins at initiator block 500 and proceeds to block 502, at which an eScript is received from the Siebel repository. At block 503, automated analysis of the eScript is initiated. The next line of code is retrieved at block 504. A decision is made at block 506 whether the retrieved line contains a "set value field". If the line contains a "set value field" the process continues to block 508. If the line does not contain a "set value field" the process continues to block 510. At block 508 a decision is made whether ");" is detected in the last three characters of the line. If ");" is detected by the algorithm, the eScript contains hard-coded values, and the process continues to block 512. If the algorithm does not detect ");" in the last three characters of the line, the process continues to block 510. At block 506 a decision is made whether the end of the eScript file has been reached. If the end of the process has not been reached, the process returns to block 504. The process ends at block 514 if the end of the file has been reached. At block 512 a log entry is written. The process ends at block 514.

Figure 6:
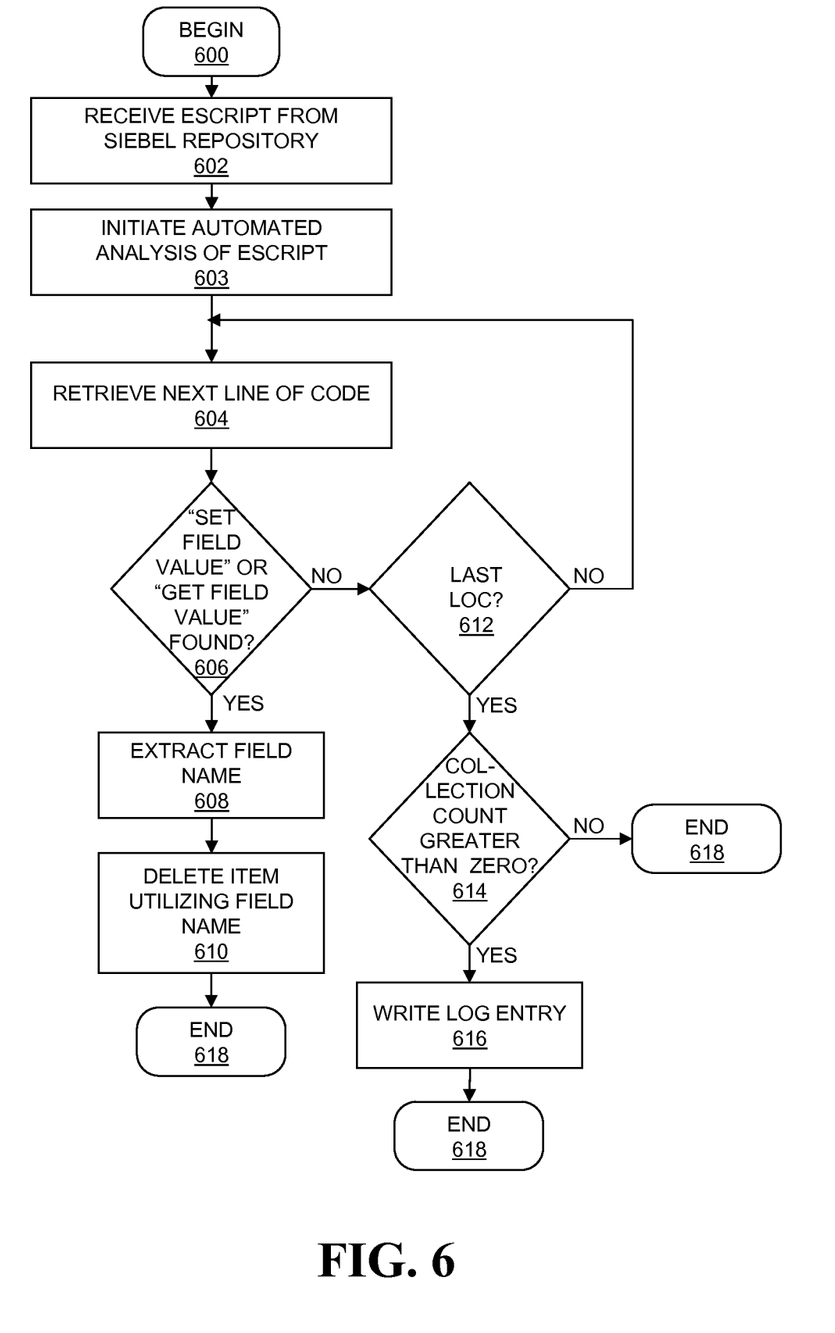
FIG. 6 is a logic flow chart describing the detection of unnecessarily activated fields, within an eScript, in accordance with one embodiment of the invention.

FIG. 6 describes the method for detecting unnecessarily activated fields, within an eScript. The process of FIG. 6 begins at initiator block 600 and proceeds to block 602, at which an eScript is received from the Siebel repository. At block 603, automated analysis of the eScript is initiated. The next line of code, within the eScript, is retrieved at block 604. A decision is made at block 606 whether the statements of: "set field value" or "get field value" have been detected. If the statements of: "set field value" or "get field value" have been detected the process continues to block 608. If the statements of: "set field value" or "get field value" have not been detected the process continues to block 612. At block 608 the field name associated with "set field value" or "get field value" is extracted. The collection item associated with the field name is deleted utilizing the field name as a key. The process ends at block 618.

A decision is made at block 612 whether the last line of code (LOC) is detected. If the last line of code is detected, the process continues to block 614. The process returns to block 604 if the last line of code is not detected. A decision is made, at block 614, whether the collection count is greater than zero. If the collection count is not greater than zero, the process ends at block 618. A log entry is written, at block 616, if the collection count is greater than zero. The process ends a block 618.

Figure 7:
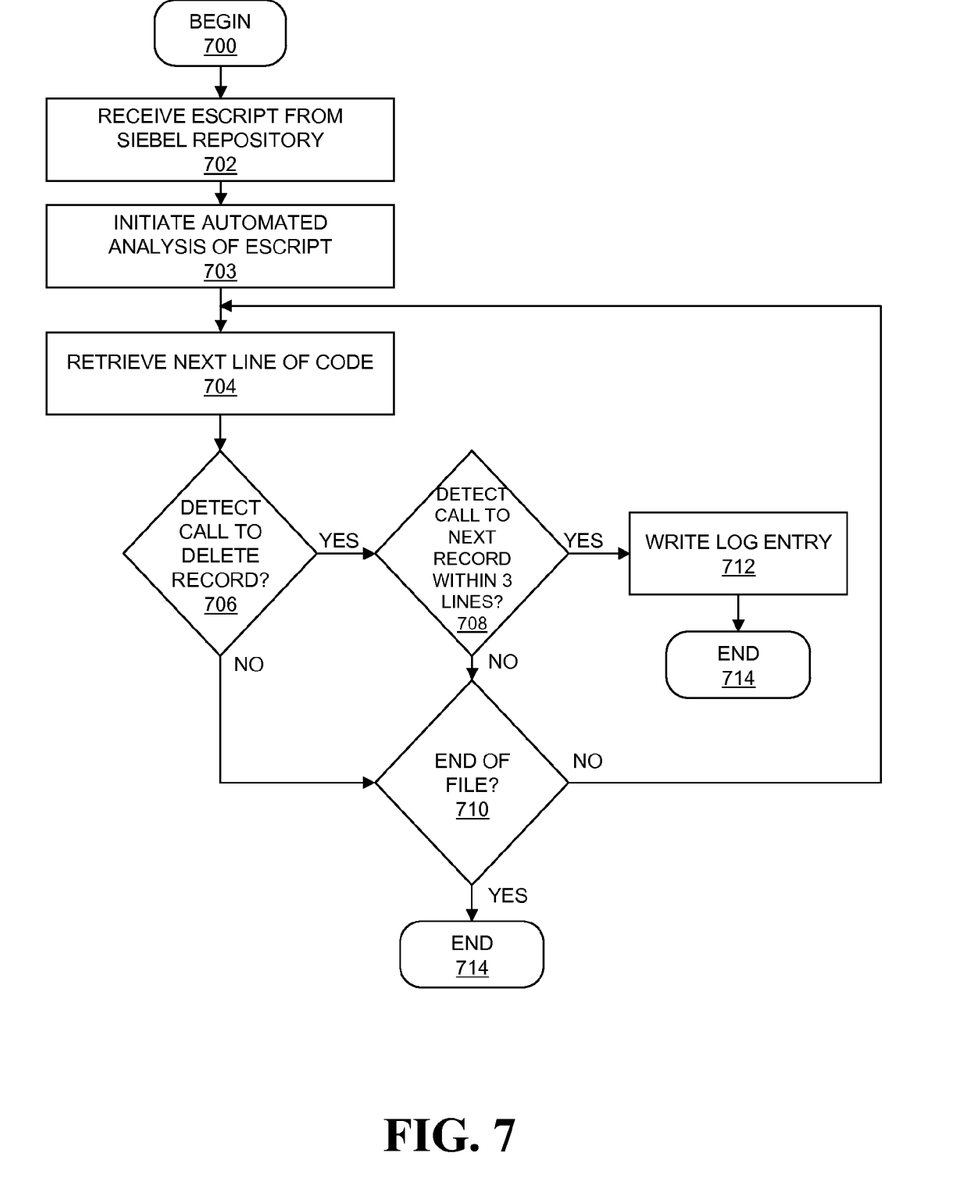
FIG. 7 is a logic flow chart for detecting a pattern associated with calls to "NextRecord," within an eScript, according to one embodiment of the invention.

The method for detecting a pattern associated with calls to "NextRecord," within an eScript is described in FIG. 7. The process of FIG. 7 begins at initiator block 700 and proceeds to block 702, at which an eScript is received from the Siebel repository. At block 703, automated analysis of the eScript is initiated. The next line of code, within the eScript, is retrieved at block 704. A decision is made, at block 706, whether a call to delete record ("DeleteRecord") has been detected. If a call to delete record has been detected, the process continues to block 708. If a call to delete record has not been detected, the process continues to block 710. At block 708 a decision is made whether a call to next record ("NextRecord") is detected within three lines of the call to delete record. If the call to next record is detected within three lines of the call to delete record, the process continues to block 712. If a call to next record is not detected, within three lines of the call to delete record, the process continues to block 710. A log entry is written at block 712. The process ends at block 714. A decision is made, at block 710, whether the end of the file is reached. If the end of the file is not reached, the process returns to block 704. If the end of the file is reached, the process ends at block 714.

Figure 8:
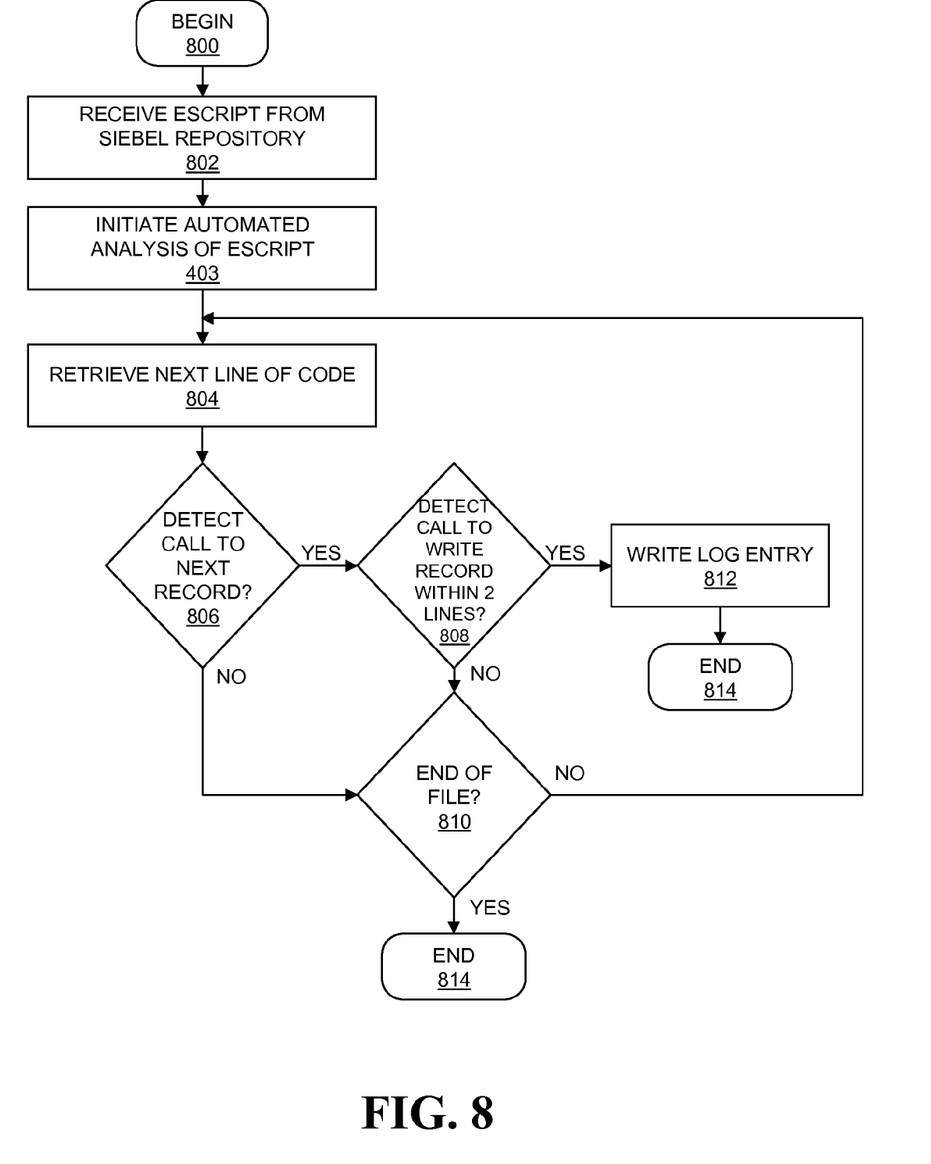
FIG. 8 is a logic flow chart describing the detection of unnecessary code, within an eScript, in accordance with one embodiment of the invention.

FIG. 8 describes the method for detecting unnecessary code, within an eScript. The process of FIG. 8 begins at initiator block 800 and proceeds to block 802, at which an eScript is received from the Siebel repository. At block 803, automated analysis of the eScript is initiated. The next line of code, within the eScript, is retrieved at block 804. A decision is made, at block 806, whether a call to next record ("NextRecord") has been detected. If a call to next record has been detected, the process continues to block 808. If a call to next record has not been detected, the process continues to block 810. At block 808 a decision is made whether a call to write record ("WriteRecord") is detected, within two lines of the call to next record. If the call to write record is detected within two lines of the call to next record, the process continues to block 812. If a call to write record is not detected within two lines of the call to next record, the process continues to block 810. A log entry is written at block 812. The process ends at block 814. A decision is made, at block 810, whether the end of the file is reached. If the end of the file is not reached, the process returns to block 804. If the end of the file is reached, the process ends at block 814.

In the flow charts above, one or more of the methods are embodied as a computer program product in a computer readable device or containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage devices such as fixed (hard) drives, diskettes, optical disks, magnetic tape, semiconductor memories such as ROMs, PROMs, etc., thereby making an article of manufacture (or computer program product) in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution. By way of example, a non exclusive list of types of media, includes recordable type (tangible) media/devices such as floppy disks, thumb drives, hard disk drives, CD ROMs, and DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A computer-implemented method comprising:
   extracting an eScript from a Siebel repository;
   conducting an automated line-by-line analysis of the eScript to detect and/or identify one or more pre-identified types of issues within a configuration and script of the eScript;
   in response to detecting one or more issues with the eScript, writing a result of the analysis to at least one log file document;
   determining whether an end of the eScript file has been reached;
   terminating the analysis if the end of the file has been reached; and
   incorporating the result of the log file document into a spreadsheet to provide a more readable output format;
   wherein the extracting of the eScript further comprises receiving the eScript within a DAVID (Development Application Verification Information on Demand) module for Siebel applications and wherein the analysis of the eScript is completed via a SiebelParser; and wherein the one or more issues comprise one or more of: empty event handlers, explicit object release, setting field values utilizing hard coded values, unnecessarily activated fields, a call to next record after a call to delete record, and functions containing unnecessary code.

2. The method of claim 1, further comprising:

in response to detecting that the eScript contains an empty event handler, checking whether the eScript (a) is empty and contains no text or (b) contains a required three lines or less; and in response to the eScript being empty or containing the required three lines or less, writing a result of the checking to the log file.

3. The method of claim 1, further comprising:

checking for both strong typing and special eScript functions within the eScript;

checking for specific types of statements with a variable name, including "loBusObject=null";

deleting an item of a VB.Net collection object utilizing the variable name;

analyzing each line of extracted eScript;

in response to completing the analyzing, determining if a remaining number of items in the VB.Net collection is greater than zero; and in response to the remaining number of item being greater than zero, writing a result to the log file document, indicating that an object has not been released correctly.

4. The method of claim 3, further comprising:

determining whether a pattern is detected identifying the object to be deleted;

in response to detecting a pattern identifying the object to be deleted, deleting the object and retrieving a next line of code;

determining whether the line of code being analyzed is a last line of code;

if the line of code is not the last line of code, retrieving the next line of code;

if the line of code is the last line of code, determining whether a collection count is greater than zero; and in response to the collection count being greater than zero, writing an entry into the log file document indicating that the eScript contains explicit objects to be released.

5. The method of claim 1, further comprising:

enabling a count to track lines of code ending with a line feed;

determining whether the count of the lines of code which ends with a line feed within the eScript is equal to three;

in response to the count of the lines of code being equal to three, writing an entry to the log file document;

in response to the count of the lines of code being less than three, retrieving a next line of code within the eScript; and in response to the count of the lines of code being greater than three, writing the results to the log file document indicating that the eScript contains empty event handlers.

6. The method of claim 1, further comprising:

determining whether the retrieved line of code contains a "set value field";

in response to the line containing a "set value field", determining whether character sequence ");" is detected in a last three characters of the line; and in response to detecting ");" character sequence in the last three characters of the line, indicating that the eScript contains hard-coded values, writing an entry to the log file document indicating detection of hard-coded values within the eScript.

7. The method of claim 1, further comprising:

determining whether at least one of "set field value" and "get field value" statements has been detected;

in response to detecting at least one of the statements, extracting a field name associated with "set field value" or "get field value", and deleting a collection item associated with the field name, wherein the deleting utilizes the field name as a key;

determining whether a collection count is greater than zero; and in response to the collection count being greater than zero, writing an entry to the log file document indicating that unnecessarily activated filed have been detected within the eScript.

8. The method of claim 1, further comprising:

determining whether a call to delete record ("DeleteRecord") has been detected;

in response to detecting a call to delete record, determining whether a call to next record ("NextRecord") is detected within three lines of the call to delete record; and in response to detecting a call to next record within three lines of the call to delete record, writing an entry to the log entry document indicating detection of a pattern associated with calls to "NextRecord".

9. The method of claim 1, further comprising:

determining whether a call to next record ("NextRecord") has been detected;

in response to detecting a call to next record has been detected, determining whether a call to write record ("WriteRecord") is detected within two lines of the call to next record; and writing a log entry indicating detection of unnecessary code to the log file document in response to detecting the call to write record within two lines of the call to next record.

10. A data processing system comprising a processor and program code executing on the processor that configures the processor to:

extract an eScript from a Siebel repository;

conduct an automated line-by-line analysis of the eScript to detect and/or identify one or more pre-identified types of issues within a configuration and script of the eScript;

in response to detecting one or more issues with the eScript, write a result of the analysis to at least one log file document;

determining whether an end of the eScript file has been reached;

terminating the analysis if the end of the file has been reached; and incorporating the result of the log file document into a spreadsheet to provide a more readable output format;

wherein the extracting of the eScript further comprises receiving the eScript within a DAVID (Development Application Verification Information on Demand) module for Siebel applications and wherein the analysis of the eScript is completed via a SiebelParser; and wherein the one or more issues comprise one or more of: empty event handlers, explicit object release, setting field values utilizing hard coded values, unnecessarily activated fields, a call to next record after a call to delete record, and functions containing unnecessary code.

11. The data processing system of claim 10, further comprising program code executing on the processor that configures the processor to perform at least one sequence of functions of:

in response to detecting that the eScript contains an empty event handler, check whether the eScript (a) is empty and contains no text or (b) contains a required three lines or less; and in response to the eScript being empty or containing the required three lines or less, write a result of the checking to the log file;

check for both strong typing and special eScript functions within the eScript; check for specific types of statements with a variable name, including "loBusObject=null"; delete an item of a VB.Net collection object utilizing the variable name; analyze each line of extracted eScript; in response to completing the analyzing, determine if a remaining number of items in the VB.Net collection is greater than zero; and in response to the remaining number of item being greater than zero, write a result to the log file document, indicating that an object has not been released correctly; and enable a count to track lines of code ending with a line feed; determine whether the count of the lines of code which ends with a line feed within the eScript is equal to three; in response to the count of the lines of code being equal to three, write an entry to the log file document; in response to the count of the lines of code being less than three, retrieve a next line of code within the eScript; in response to the count of the lines of code being greater than three, write the results to the log file document indicating that the eScript contains empty event handlers.

12. The data processing system of claim 10, further comprising program code executing on the processor that configures the processor to perform at least one sequence of functions of:

determine whether a pattern is detected identifying the object to be deleted; in response to detecting a pattern identifying the object to be deleted, delete the object and retrieving a next line of code; determine whether the line of code being analyzed is a last line of code; if the line of code is not the last line of code, retrieve the next line of code; if the line of code is the last line of code, determine whether a collection count is greater than zero; and in response to the collection count being greater than zero, write an entry into the log file document indicating that the eScript contains explicit objects to be released;

determine whether the retrieved line of code contains a "set value field"; in response to the line containing a "set value field", determine whether character sequence ");" is detected in a last three characters of the line; and in response to detecting ");" character sequence in the last three characters of the line, writing an entry to the log file document indicating detection of hard-coded values within the eScript; and determine whether at least one of "set field value" and "get field value" statements has been detected; in response to detecting at least one of the statements, extract a field name associated with "set field value" or "get field value", and delete a collection item associated with the field name, wherein the deleting utilizes the field name as a key; determine whether a collection count is greater than zero; and in response to the collection count being greater than zero, write an entry to the log file document indicating that unnecessarily activated filed have been detected within the eScript.

13. The data processing system of claim 10, further comprising program code executing on the processor that configures the processor to perform at least one sequence of functions of:

determine whether a call to delete record ("DeleteRecord") has been detected; in response to detecting a call to delete record, determine whether a call to next record ("NextRecord") is detected within three lines of the call to delete record; in response to detecting a call to next record within three lines of the call to delete record, write an entry to the log entry document indicating detection of a pattern associated with calls to "NextRecord"; and determine whether a call to next record ("NextRecord") has been detected; in response to detecting a call to next record has been detected, determine whether a call to write record ("WriteRecord") is detected within two lines of the call to next record; and write a log entry indicating detection of unnecessary code to the log file document in response to detecting the call to write record within two lines of the call to next record.

14. A computer program product comprising:

a computer readable device; and program code on the computer readable device that when executed within a processing device enables the processing device to perform the functions of:

extracting an eScript from a Siebel repository;

conducting an automated line-by-line analysis of the eScript to detect and/or identify one or more pre-identified types of issues within a configuration and script of the eScript;

in response to detecting one or more issues with the eScript, writing a result of the analysis to at least one log file document;

determining whether an end of the eScript file has been reached;

terminating the analysis if the end of the file has been reached;

incorporating the result of the log file document into a spreadsheet to provide a more readable output format;

wherein the extracting of the eScript further comprises receiving the eScript within a DAVID (Development Application Verification Information on Demand) module for Siebel applications and wherein the analysis of the eScript is completed via a SiebelParser; and wherein the one or more issues comprise one or more of: empty event handlers, explicit object release, setting field values utilizing hard coded values, unnecessarily activated fields, a call to next record after a call to delete record, and functions containing unnecessary code.

15. The computer program product of claim 14, further comprising program code that enables the processing device to perform at least one of the following sequences:

in response to detecting that the eScript contains an empty event handler, checking whether the eScript (a) is empty and contains no text or (b) contains a required three lines or less; and in response to the eScript being empty or containing the required three lines or less, writing a result of the checking to the log file;

checking for both strong typing and special eScript functions within the eScript; checking for specific types of statements with a variable name, including "loBusObject=null"; deleting an item of a VB.Net collection object utilizing the variable name; analyzing each line of extracted eScript; in response to completing the analyzing, determining if a remaining number of items in the VB.Net collection is greater than zero; and in response to the remaining number of item being greater than zero, writing a result to the log file document, indicating that an object has not been released correctly.

16. The computer program product of claim 14, further comprising program code that enables the processing device to perform at least one of the following sequences:

enabling a count to track lines of code ending with a line feed; determining whether the count of the lines of code which ends with a line feed within the eScript is equal to three; in response to the count of the lines of code being equal to three, writing an entry to the log file document; in response to the count of the lines of code being less than three, retrieving a next line of code within the eScript; and in response to the count of the lines of code being greater than three, writing the results to the log file document indicating that the eScript contains empty event handlers; and determining whether a pattern is detected identifying the object to be deleted; in response to detecting a pattern identifying the object to be deleted, deleting the object and retrieving a next line of code; determining whether the line of code being analyzed is a last line of code; if the line of code is not the last line of code, retrieving the next line of code; if the line of code is the last line of code, determining whether a collection count is greater than zero; and in response to the collection count being greater than zero, writing an entry into the log file document indicating that the eScript contains explicit objects to be released.

17. The computer program product of claim 14, further comprising program code that enables the processing device to perform at least one of the following sequences:

determining whether the retrieved line of code contains a "set value field"; in response to the line containing a "set value field", determining whether character sequence ");" is detected in a last three characters of the line; and in response to detecting ");" character sequence in the last three characters of the line, indicating that the eScript contains hard-coded values, writing an entry to the log file document indicating detection of hard-coded values within the eScript; and determining whether at least one of "set field value" and "get field value" statements has been detected; in response to detecting at least one of the statements, extracting a field name associated with "set field value" or "get field value", and deleting a collection item associated with the field name, wherein the deleting utilizes the field name as a key; determining whether a collection count is greater than zero; and in response to the collection count being greater than zero, writing an entry to the log file document indicating that unnecessarily activated filed have been detected within the eScript.

18. The computer program product of claim 14, further comprising program code that enables the processing device to perform at least one of the following sequences:

determining whether a call to delete record ("DeleteRecord") has been detected; in response to detecting a call to delete record, determining whether a call to next record ("NextRecord") is detected within three lines of the call to delete record; in response to detecting a call to next record within three lines of the call to delete record, writing an entry to the log entry document indicating detection of a pattern associated with calls to "NextRecord"; and determining whether a call to next record ("NextRecord") has been detected; in response to detecting a call to next record has been detected, determining whether a call to write record ("WriteRecord") is detected within two lines of the call to next record; and writing a log entry indicating detection of unnecessary code to the log file document in response to detecting the call to write record within two lines of the call to next record.

* * * * *